United States Patent [19]
Nishida et al.

[11] Patent Number: 6,040,674
[45] Date of Patent: Mar. 21, 2000

[54] MOTOR DRIVING DEVICE, METHOD OF ADJUSTING THE SAME, AND INFORMATION STORAGE DEVICE

[75] Inventors: Masatsugu Nishida; Toru Ikeda; Tomoki Yokoyama, all of Kawasaki, Japan

[73] Assignee: Fujitsu Limited, Kawasaki, Japan

[21] Appl. No.: 09/354,893

[22] Filed: Jul. 16, 1999

[30]        Foreign Application Priority Data

Feb. 19, 1999   [JP]   Japan .................................. 11-042292

[51] Int. Cl.$^7$ .................. H02P 8/00; G11B 5/58
[52] U.S. Cl. ............... 318/632; 318/599; 360/77.01; 369/44.25; 369/44.35
[58] Field of Search ..................... 318/563, 565, 318/599, 632, 634, 293, 294; 388/934; 360/75, 77.01, 77.02, 77.03; 369/43, 44.11, 44.25, 44.35, 44.36

[56]               References Cited

U.S. PATENT DOCUMENTS 5,699,207   12/1997   Supino et al. ..................... 360/78.09
5,789,895   8/1998   Lee .......................................... 318/811
5,808,975   9/1998   Tani .......................................... 369/32

FOREIGN PATENT DOCUMENTS 8-047280   2/1996   Japan .
9-047029   2/1997   Japan .
10-210787   8/1998   Japan .

*Primary Examiner*—Bentsu Ro
*Attorney, Agent, or Firm*—Greer, Burns & Crain, Ltd.

[57]               ABSTRACT

A method of adjusting a motor driving device which performs current-feedback PWM drive, the motor driving device, and an information storage device are provided. According to the present invention, a drive circuit is turned off by a control circuit, and a target current indication signal is gradually increased. The content of a register which stores the result of comparison between the output signal of a comparator circuit and the target current indication signal is then detected. If the content of the register is "1", i.e., if the output signal of the current sense circuit is smaller than a target current indication signal, the target current indication signal immediately before the output of the comparator circuit reaches "1" is stored as the reference value of the target current indication signal.

20 Claims, 17 Drawing Sheets

FIG. 5 PRIOR ART

TRUTH TABLE OF DRIVE CONTROL IC

| *EN | DIR | P-OUTPUT | N-OUTPUT | TERMINAL T5 | TERMINAL T6 | REMARKS |
|---|---|---|---|---|---|---|
| L | H | H | L | HIGH | LOW | Forward |
| L | L | L | H | LOW | HIGH | Reverse |
| H | X(Don't Care) | L | L | Z | Z | HIGH IMPEDANCE |

MOTOR DRIVING DEVICE, METHOD OF ADJUSTING THE SAME, AND INFORMATION STORAGE DEVICE

BACKGROUND OF THE INVENTION

1. Field of the Invention

The present invention generally relates to a motor driving device, a method of adjusting the same, and an information storage device, and more particularly, to a motor driving device which performs current-feedback PWM drive, a method of adjusting the same, and an information storage device.

2. Description of the Related Art

In an optical disk, an actuator is often used for focusing, tracking and moving a recording head in the radial direction of a recording medium.

Current control is conducted for the servo control of the actuator. PWM (Pulse Width Modulation) control which requires low power consumption is also conducted, taking advantage of its inductance characteristics. In the PWM drive, a current flowing in the actuator is detected, and the current control is conducted in accordance with the detected current and a current indication value.

FIG. 1 is a block diagram of one example of the prior art. A PWM driving device 1 comprises a processor 2, a driver IC 3, an actuator 4, a sense resistance 5, a current sense circuit 6, and a comparator circuit 7. The processor 2 sends a drive indication signal to the driver IC 3. The processor 2 includes a logic circuit 8 and a digital-analog converter (DAC) 9. The logic circuit 8 generates a first control signal *EN from a drive signal DRVON generated in the processor 2 and an output signal *DTCR of the comparator circuit 7. The DAC 9 converts a target current indication value calculated in the processor 2 into an analog target current indication signal, and sends the target current indication signal to the comparator circuit 7.

FIG. 2 is a block diagram of the logic circuit of the prior art. The logic circuit 8 comprises a NAND gate 8a, a timer 8b, and an OR gate 8c. The NAND gate 8a receives the drive signal DRVON generated inside and the output signal *DTCR of the comparator circuit 7. The NAND gate 8a then outputs a NAND logic of the drive signal DRVON and the output signal *DTCR of the comparator circuit 7. The timer 8b receives the output signal *DTCR of the comparator circuit 7. The timer 8b operates in accordance with the output signal *DTCR of the comparator circuit 7, and outputs a high level for a predetermined period of time. The OR gate 8c outputs an OR logic of the output of the NAND gate 8a and the output logic of the timer 8b. The output signal of the OR gate 8c serves as the first control signal *EN.

FIGS. 3A to 3E show the operation of the logic circuit of the example of the prior art. FIG. 3A shows the drive signal DRVON; FIG. 3B shows the output signal *DTCR of the comparator circuit 7; FIG. 3C shows the output signal of the NAND gate 8a; FIG. 3D shows the output signal of the timer 8b; and FIG. 3E shows the first control signal *En, i.e., the output signal of the OR gate 8c.

As shown in FIGS. 3A and 3C, when the drive signal DRVON reaches the high level at time t1, the output of the NAND gate 8a reaches a low level.

As shown in FIG. 3B, the output signal *DTCR of the comparator circuit 7 falls at times t2, t3, and t4. The timer 8b detects the falls, and the output signal of the timer 8b reaches the high level for a predetermined period of time T0, as shown in FIG. 3D. The first control signal *EN is the OR logic of the output signal of the NAND gate 8a and the output signal of the timer 8b shown in FIG. 3D. Accordingly, the first control signal *EN has a waveform as shown in FIG. 3E.

The first control signal *EN shown in FIG. 3E is sent to the driver IC 3 as an inversion enable signal. The driver IC 3 further receives a second control signal DIR from the processor 2, and the second control signal DIR indicates a driving direction. The driver IC 3 supplies both ends of the actuator 4 with a potential difference in accordance with the first and second control signals *EN and DIR transmitted from the processor 2, so that a current starts flowing in the actuator 4.

FIG. 4 is a block diagram of the driver IC 3 of the prior art. The driver IC 3 comprises control logic 3a and a drive circuit 3b. The control logic 3a generates first and second drive control signals P and N in accordance with the first and second control signals *EN and DIR supplied to terminals T1 and T2 from the driver IC 3. The first and second drive control signals P and N are sent to the drive circuit 3b. The drive circuit 3b comprises transistors Q1 to Q4 and diodes D1 to D4. A terminal T3 is connected to the high potential side (the power source side), a terminal T4 is connected to a low potential side (the ground side), and terminals 5 and 6 are connected to the actuator 4.

FIG. 5 shows the operation of the control logic of the prior art.

When the first control signal *EN supplied from the processor 2 is at a low level while the second control signal DIR is at a high level, as shown in FIG. 4, the control logic 3a sets the first drive control signal P at the high level and the second drive control signal N at the low level. When the first drive control signal P is at the high level and the second drive control signal N is at the low level, the transistors Q1 and Q2 are turned on, and the transistors Q3 and Q4 are turned off. Here, the terminal T5 of the actuator 4 has a high potential, and the terminal T6 has a low potential. Accordingly, a current flows as indicated by a solid line in FIG. 4 (T3→Q1→T5→M→T6→Q2→T4).

When the first control signal *EN supplied from the processor 2 is at the low level while the second control signal DIR is also at the low level and the second drive control signal N is at the high level, the control logic 3a sets the first drive control signal P at the low level and the second drive control signal N at the high level. When the first drive control signal P is at the low level, the transistors Q3 and A4 are turned on, and the transistors Q1 and Q2 are turned off. Here, the terminal T6 of the actuator 4 has a high potential, and the terminal T5 has a low potential. Accordingly, a current flows as indicated by a broken line in FIG. 4 (T3→Q3→T6→M→T5→Q4→T4).

When the first control signal *EN supplied from the processor 2 is at the high level, the control logic 3a sets the first and second drive control signals P and N both at the low level. By doing so, the transistors Q1 to Q4 are all turned off, and both ends of the actuator 4 are put in a high-impedance state to block a voltage.

The control logic 3a is compensated so that the first and second drive control signals P and N do not reach the high level at the same time, preventing a case that the transistors Q1 to Q4 are all turned on.

As described above, the driver IC 3 can perform the PWM drive by supplying a voltage to both ends of the actuator 4 in accordance with the first control signal *EN from the processor 2.

The sense resistance 5 is connected to the ground terminal T4 in the driver IC 3. The current sense circuit 6 is connected to both ends of the sense resistance 5.

The current sense circuit 6 comprises resistances R1 to R4 and an operational amplifier OP1, which constitute a non-inverting amplifier circuit. The current sense circuit 6 outputs a voltage Vref1 and a level-shifted current sense signal in accordance with the voltages at both ends of the sense resistance 5. The output of the current sense circuit 6 is sent to the comparator circuit 7. The comparator circuit 7 receives the current sense signal from the current sense circuit 6, and the target current indication signal from the processor 2.

The current sense signal supplied from the current sense circuit 6 is sent to an inverting input terminal in the comparator circuit 7. On the other hand, the target current indication signal is sent to a non-inverting input terminal in the comparator circuit 7.

The comparator circuit 7 compares the target current indication signal supplied from the processor 2 with the current sense signal detected in the current sense circuit 6, and outputs a 2-digit signal at a high or low level. If the output from the current sense circuit 6 is larger than the target current indication signal supplied from the processor 2, the comparator circuit 7 outputs a low-level signal. If the output from the current sense circuit 6 is smaller than the target current indication signal supplied from the processor 2, the comparator circuit 7 outputs a high-level signal.

The comparison result of the comparator circuit 7 is sent to the processor 2. In accordance with an external control signal and the comparison result of the comparator circuit 7, the processor 2 outputs the first control signal *EN and the second control signal DIR to the driver IC 3.

FIGS. 6A to 6C show the operation in the prior art. FIG. 6A shows the target current indication signal and the current sense signal; FIG. 6B shows the output signal *DTCR from the comparator circuit 7; and FIG. 6C shows the waveform of the first control signal *EN.

If the current sense signal from the current sense circuit 6 becomes larger than the target current indication signal supplied from the processor 2 as shown in FIG. 6A, the output signal *DTCR of the comparator circuit 7 becomes a low-level signal as shown in FIG. 6B. When the output signal *DTCR is at the low level, the first control signal *EN supplied from the processor 2 to the driver IC 3 becomes a high-level signal at least for the predetermined period of time T0, as shown in FIG. 6C.

When the first control signal *EN is at the high level, the voltage supply to the actuator 4 is stopped. If a current has been flowing from the terminal T5 to the terminal T6 in the actuator 4, it flows into the power source through the route (T4→D4→T5→M→T6→D3→T3) shown in FIG. 4. If a current has been flowing from the terminal T6 to the terminal T5 in the actuator 4, it flows into the power source through the route (T4→D2→T6→M→T5→D1→T3) shown in FIG. 4.

When the first control signal *EN becomes a low-level signal, the voltage supply is resumed, and a current increases in accordance with the transient characteristics of the coils. In this manner, the voltage supply to the actuator 4 is started and stopped depending on the first control signal *EN. Here, the target current indication signal supplied from the processor 2 to the comparator circuit 7 is made large, so that the mean value of the current flowing in the actuator 4 becomes large. Thus, the torque in the actuator 4 becomes high accordingly.

FIG. 7 shows the characteristics of the mean current with respect to the target current indication value. As the target current indication signal rises, the driving period is prolonged, and the mean drive current is increased. Accordingly, the mean drive current has characteristics of changing linearly with respect to the target current indication signal, as indicated by a solid line in FIG. 7.

Since the comparator circuit 7 compares the output of the current sense circuit 6 with the target current indication signal, the characteristics of the mean drive current with respect to the target current indication signal are influenced by the characteristics of the current sense circuit 6.

Due to variations in the current sense circuit 6 and the DAC 9, crossover distortion (the non-linearity around the zero point of current) is caused as indicated by a broken line a and a dot-and-dash line b in FIG. 7. If the dead zone is too wide as indicated by the broken line a in FIG. 7, oscillation is caused in the servo control, even with an increased target current indication signal. In a case where zero-setting cannot be carried out for the current as indicated by the dot-and-dash line b in FIG. 7, a seek error might be caused.

To avoid the above problem, the resistances R3 and R4 of the current sense circuit 6 are used as variable resistances to adjust the linearity around the current zero point.

As described so far, the conventional motor driving circuit has problems that there are great variations in the components of the current sense circuit 6, and that crossover distortion is often caused due to the dead zone indicated by the broken line in FIG. 7.

Even when a discrete system is employed to reduce the variations in the components, there are problems that adjustment procedures are complicated, and that accurate adjustment cannot be carried out.

SUMMARY OF THE INVENTION

A general object of the present invention is to provide a method of adjusting a motor driving device, the motor driving device, and an information storage device, in which the above disadvantages can be eliminated.

A more specific object of the present invention is to provide a method of adjusting a motor driving device, the motor driving device, and an information storage device, in which offset can be adjusted so as to automatically minimize a dead zone.

The above objects of the present invention are achieved by a method of adjusting a motor driving device, which method comprises the steps of: detecting a current flowing in a motor; generating a current detection signal based on the current; comparing the current detection signal with a current indication value; generating a comparison signal based on a relationship between the current detection signal and the current indication value; controlling the current flowing in the motor in accordance with the comparison signal; detecting the comparison signal while varying the current indication value; and setting a zero level of the current indication value based on the variation of the comparison signal. The zero level of the indication value may also be set based on a variation of the comparison signal detected while the bias voltage of the current detection signal is varied.

The above objects of the present invention are also achieved by a motor driving device which comprises: a current detection unit which detects a current flowing in a motor; a comparator unit which compares the current detected by the current detection unit with a current indication value to generate a comparison signal; a current control unit which controls the current flowing in the motor in accordance with a comparison result from the comparator unit; and a zero-level adjustment unit which detects the comparison signal while varying the current indication value, and sets a zero level of the current indication value based on the variation of the comparison signal.

The above objects of the present invention are also achieved by an information storage device which comprises: a recording head which records information on a recording medium; an actuator which moves the recording head against the recording medium; a drive control unit which detects a current flowing in the actuator, compares the detected current with a current indication value to generate a comparison signal, and controls the current flowing in the actuator in accordance with the comparison signal; and a zero-level adjustment unit which detects the comparison signal while varying the current indication value, and sets a zero level of the current indication value based on the variation of the comparison signal.

The above and other objects and features of the present invention will become more apparent from the following description taken in conjunction with the accompanying drawings.

BRIEF DESCRIPTION OF THE DRAWINGS

FIG. 5 shows the operation of control logic of the example of the prior art;

DESCRIPTION OF THE PREFERRED EMBODIMENTS

The following is a description of embodiments of the present invention, with reference to the accompanying drawings.

Figure 8:
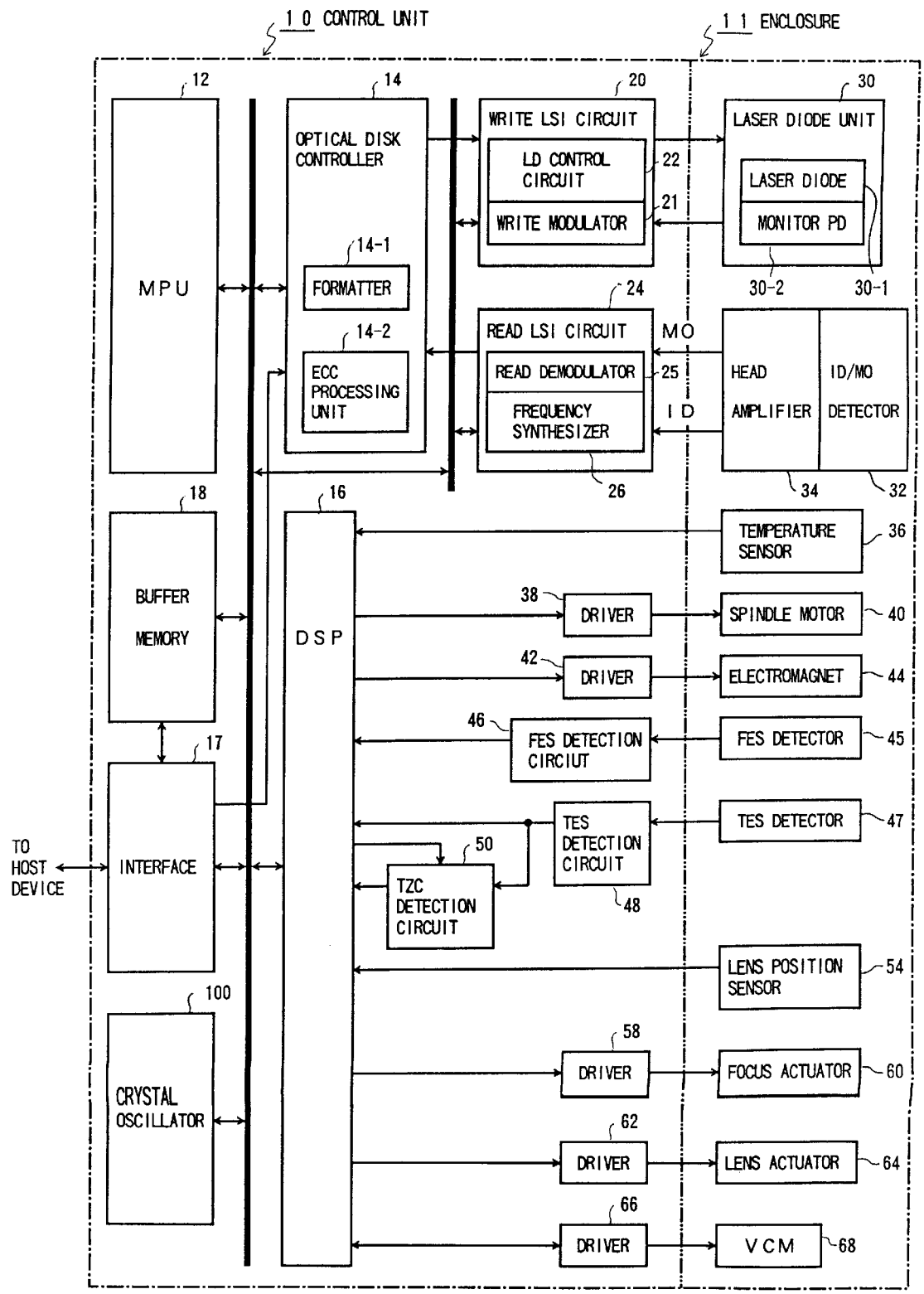
FIG. 8 is a block diagram of a first embodiment of the present invention.

FIG. 8 is a block diagram of the structure of an information storage device of a first embodiment of the present invention. In this embodiment, the present invention is applied to an optical disk device. Tracking correction methods of the present invention can also be employed in the information storage device of this embodiment.

As shown in FIG. 8, the optical disk device comprises a control unit 10 and an enclosure 11. The control unit 10 includes an MPU 12 which controls the entire optical disk device, an interface 17 which exchanges commands and data with a host device (not shown), an optical disk controller (ODC) 14 which performs necessary processes for reading from and writing on an optical disk (not shown), a digital signal processor (DSP) 16, and a buffer memory 18. The buffer memory 18 is shared by the MPU 12, the ODC 14, and the interface 17. The buffer memory 18 includes a dynamic random access memory (DRAM), for instance. A crystal oscillator 100 for generating a clock signal is connected to the MPU 12.

The ODC 14 is provided with a formatter 14-1 and an error correcting code (ECC) processing unit 14-2. At a time of write access, the formatter 14-1 divides NRZ (Non Return to Zero) write data by the sector of the optical disk to generate a record format. The ECC processing unit 14-2 generates and adds an ECC per sector write data, and also generates and adds a cyclic redundancy check (CRC) code if necessary. The ECC processing unit 14-2 then converts the ECC-coded sector data into a 1-7 run-length limited (RLL) code.

At a time of read access, the sector data is inverted by the 1-7 RLL. The ECC processing unit 14-2 performs a cyclic redundancy check, and then detects errors from the ECC and corrects them. The formatter 14-1 connects the NRZ data divided by the sector to each other, and transfers the stream of NRZ read data to the host device.

A write large scale integrated circuit (LSI) 20 comprises a write modulator 21 and a laser diode control circuit 22. The control output of the laser diode control circuit 22 is sent to a laser diode unit 30 formed in an optical unit in the enclosure 11. The laser diode unit 30 collectively includes a laser diode 30-1 and a monitoring detector 30-2. The write modulator 21 converts the write data into pit position modulation (PPM) record data or pulse width modulation (PWM) record data.

The optical disk for recording and reproducing data by the laser diode unit 30 in this embodiment is a rewritable photomagnetic cartridge medium having a capacity of 128 MB, 230 MB, 540 MB, 640 MB, or 1.3 GB. The 128-MB photomagnetic cartridge medium employs the PPM recording method, in which data is recorded in accordance with marks on the optical disk. The recording format of the 128-MB optical disk has a constant angular velocity (CAV), while the 230-MB optical disk has a zone constant angular velocity (ZCAV). The number of zones in the user's area is 1 in the 128-MB optical disk, and 10 in the 230-MB optical disk.

The 540-MB and 640-MB photomagnetic cartridge mediums employ the PWM recording method, in which the edges (the front edge and rear edge) of a mark correspond to data to be recorded. Here, the storage capacity difference between the 540-MB optical disk and the 640-MB optical disk is due to the difference in sector capacity. The sector capacity is 2048 bytes in the 640-MB optical disk, and 512 bytes in the 540-MB optical disk. The recording format of each of the optical disks has the zone constant angular velocity. The number of zones in the user's area is 11 in the 640-MB optical disk, and 18 in the 540-MB optical disk.

In this embodiment, it is possible to employ the 128-MB, 230-MB, 540-MB, 640-MB, and 1.3 GB optical disks, as described above. Also, directly rewritable optical disks of 230 MB, 540 MB, 640 MB, and 1.3 GB, can be employed. When one of the optical disks is loaded onto the optical disk device, the identification portion of the optical disk is read to identify the type of the optical disk from the pit width by the MPU 12, and the identified type is set to the ODC 14.

A read LSI circuit 24 is disposed on the read side of the ODC 14. The read LSI circuit 24 includes a read demodulator 25 and a frequency synthesizer 26. A light receiving signal of a return light of a laser beam from the laser diode 30-1 returned by an ID/MO detector 32 disposed in the enclosure 11 is inputted into the read LSI circuit 24 as an ID signal and an MO signal via a head amplifier 34.

The read demodulator 25 of the read LSI circuit 24 functions as an automatic gain control circuit, a filter, and a sector mark detecting circuit. The read demodulator 25 generates a read clock and read data, and demodulates PPM data or PWM data into the original NRZ data. Due to the zone constant angular velocity, the frequency dividing ratio in the frequency synthesizer 26 in the read LSI circuit 24 is controlled to generate a clock frequency corresponding to the zones.

The frequency synthesizer 26 is a phase-locked loop circuit having a programmable frequency divider, and generates the read clock, which is a reference clock having a predetermined frequency corresponding to the zone positions on the optical disk. Accordingly, the MPU 12 generates the reference clock of the frequency fo at the frequency dividing ratio corresponding to the zone numbers: fo=(m/n) fi. Here, the denominator n of the frequency dividing ratio m/n is inherent to each type of the 128-MB, 230-MB, 540-MB, 640 MB, and 1.3 GB optical disks. The numerator m of the frequency dividing ratio m/n varies depending on the zone position on the optical disk, and is contained in each optical disk as the table information corresponding to the zone numbers. The frequency of a reference clock generated outside the frequency synthesizer 26 is indicated by fi.

The read data demodulated in the read LSI circuit 24 is supplied to the read system of the ODC 14. After being inverted by 1-7 RLL, the read data is processed and restored into the original NRZ sector data by the ECC processing unit 14-2. The restored NRZ sector data is then converted into a stream of NRZ read data consisting of connected NRZ sector data by the formatter 14-1. The stream of NRZ read data is transferred to the host device from the interface 17 via the buffer memory 18.

The MPU 12 receives a detecting signal from a temperature sensor 36 disposed in the enclosure 11 via the DSP 16. The MPU 12 then controls the luminescent power for reading, writing, and erasing, to be the optimum values in the laser diode control circuit 22, based on the environmental temperature in the optical disk device detected by the temperature sensor 36.

The MPU 12 controls a spindle motor 40 formed in the enclosure 11 by means of a driver 38 via the DSP 16. In this embodiment, the spindle motor 40 is rotated at a constant speed of 3000 rpm, for instance, because the recording format of the optical disk has the zone constant angular velocity.

The MPU 12 also controls an electromagnet 44 formed in the enclosure 11 by means of a driver 42 via the DSP 16. The electromagnet 44 is disposed on the opposite side to the beam irradiation side of the optical disk loaded in the optical disk device. The electromagnet 44 supplies an external magnetic field to the optical disk at the time of writing or erasing.

The DSP 16 has a servo function for determining the position of the beam emitted onto the optical disk from the laser diode 30, and also functions as a seek control unit and an on-track control unit for seeking and following a desired track. The seek control and on-track control can be simultaneously carried out at the time of write access and write access to a foregoing command by the MPU 12.

To achieve the servo function of the DSP 16, a focus error signal (FES) detector 45 which receives a beam return light from the optical disk is disposed in an optical unit in the enclosure 11. An FES detecting circuit 46 generates an FES from the received light output from the FES detector 45, and then inputs the FES into the DSP 16.

The optical unit in the enclosure 11 is also provided with a tracking error signal (TES) detector 47 which receives a beam return light from the optical disk. A TES detecting circuit 48 generates a TES from the received light output from the TES detector 47, and inputs the TES into the DSP 16. The TES is also inputted into a track-zero-cross (TZC) detecting circuit 50 to generate a TZC pulse. The generated TZC pulse is inputted into the DSP 16.

A lens position sensor 54 for detecting the position of an object lens which emits a laser beam onto the optical disk is disposed in the enclosure 11, and a lens position detecting signal (LPDS) transmitted from the lens position sensor 54 is inputted into the DSP 16. To control the position of the beam spot on the optical disk, the DSP 16 controls and drives a focus actuator 60, a lens actuator 64, and a voice coil motor (VCM) 68, through drivers 58, 62, and 66.

Figure 9:
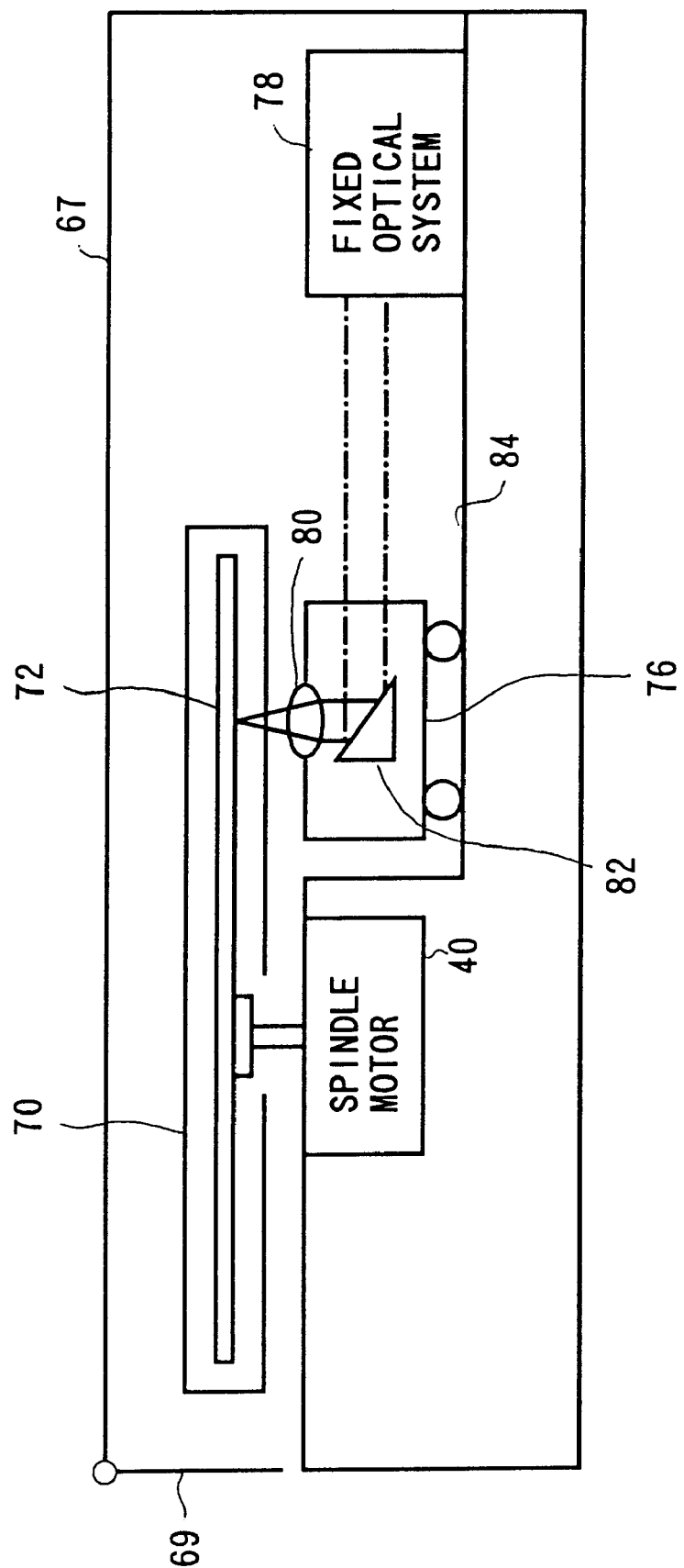
FIG. 9 is a sectional view of an enclosure of the first embodiment of the present invention.
Figure 10:
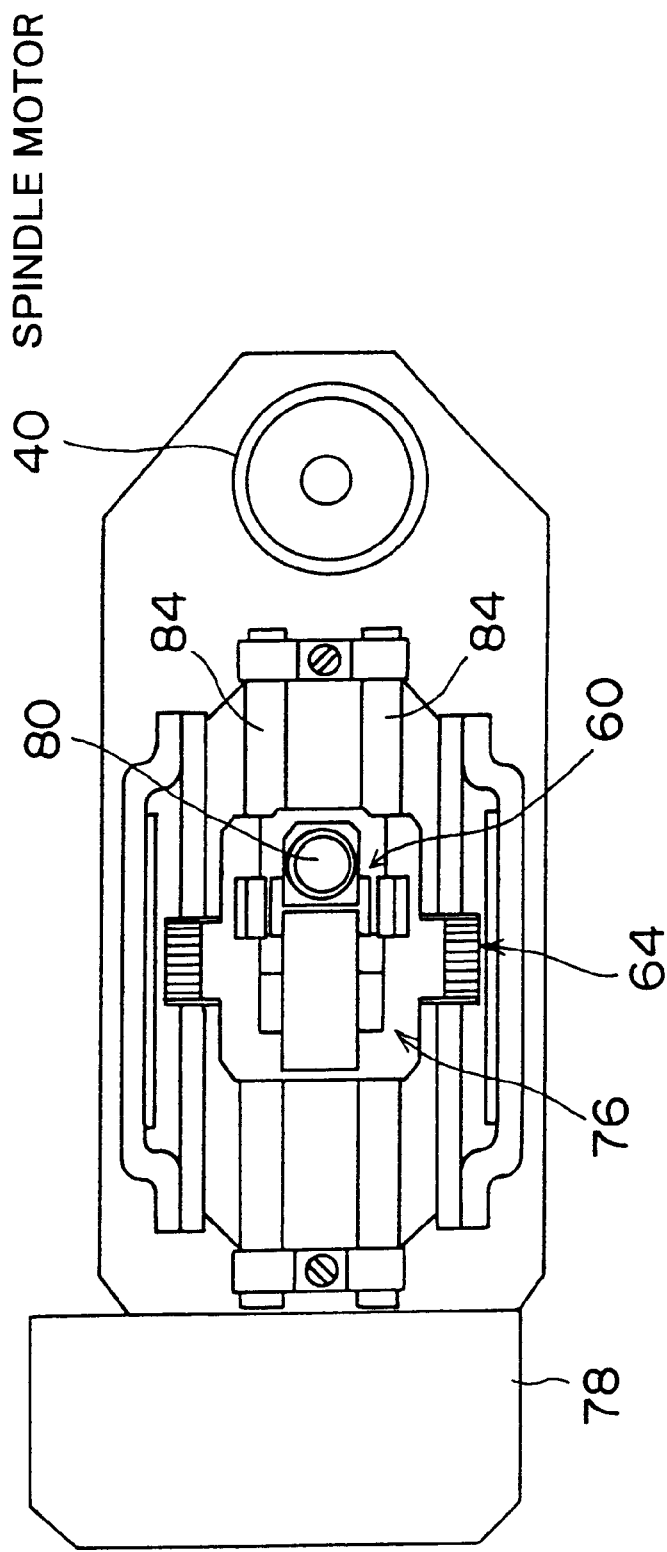
FIG. 10 is a plan view of the first embodiment of the present invention.

FIG. 9 is a sectional view of the enclosure of the first embodiment of the present invention, and FIG. 10 is a plan view of the embodiment of the present invention. As shown in FIG. 9, the spindle motor 40 is disposed in a housing 67. A cartridge 70 is inserted from an inlet door 69, so that an optical disk 72 accommodated in the cartridge 70 is attached to the hub of the rotation axis of the spindle motor 40. Thus, the optical disk 72 is loaded onto the optical disk device.

Below the optical disk 72 inside the cartridge 70, there is a movable carriage 76 which is guided by the VCM 68 on a guide rail 84 in the transverse direction of the tracks on the optical disk 72. An object lens 80 is disposed on the carriage 76, and forms a beam spot on the recording surface of the optical disk 72 by entering a beam via a mirror 82 from the laser diode 30-1 disposed in a fixed optical system 78.

The object lens 80 is controlled in the optical axis direction by the focus actuator 60 in the enclosure 11 shown in FIG. 8. The object lens 80 can be moved in a range of tens of tracks in the radial direction of the optical disk 72 by the lens actuator 64. The lens position sensor 54 shown in FIG. 8 detects the position of the object lens 80 disposed on the carriage 76. The lens position sensor 54 sets a lens position detection signal at zero halfway to the top of the optical axis of the object lens 80, and outputs the lens position detection signal in accordance with the amount of movement of different polarities through the outside and inside of the optical disk 72.

Figure 11:
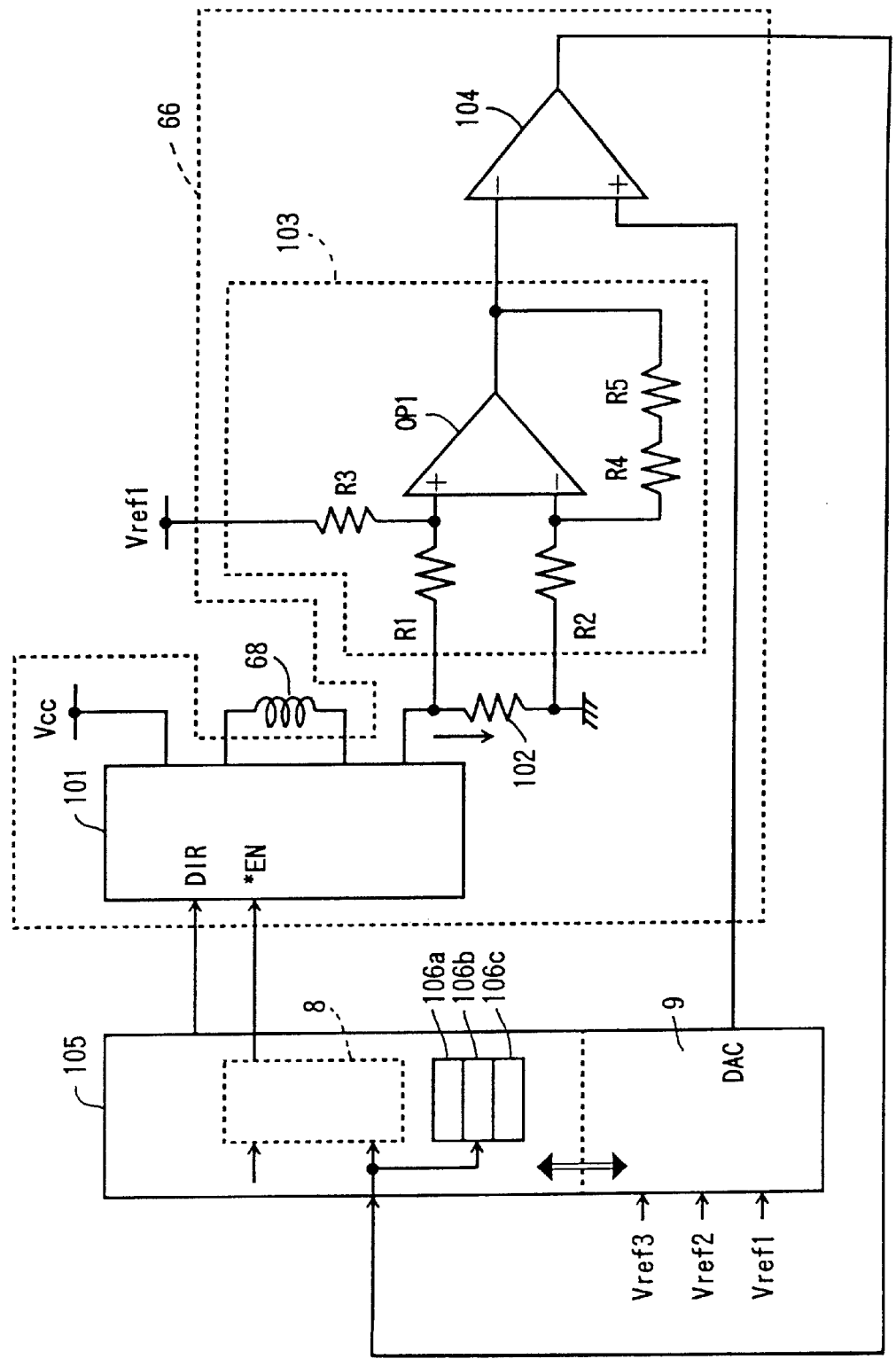
FIG. 11 is a block diagram of a driver of the first embodiment of the present invention.

FIG. 11 is a block diagram showing a driver of the first embodiment of the present invention. In FIG. 11, the same components as in FIG. 1 are indicated by the same reference numerals.

The voice coil motor (VCM) 68 is driven by a drive circuit 101, a sense resistance 102, a current sense circuit 103, a comparator circuit 104, and a control circuit 105. The control circuit 105 of FIG. 11 is equivalent to the processor 2 of FIG. 1, and the DSP 16 and MPU 12 of FIG. 8.

Figure 1:
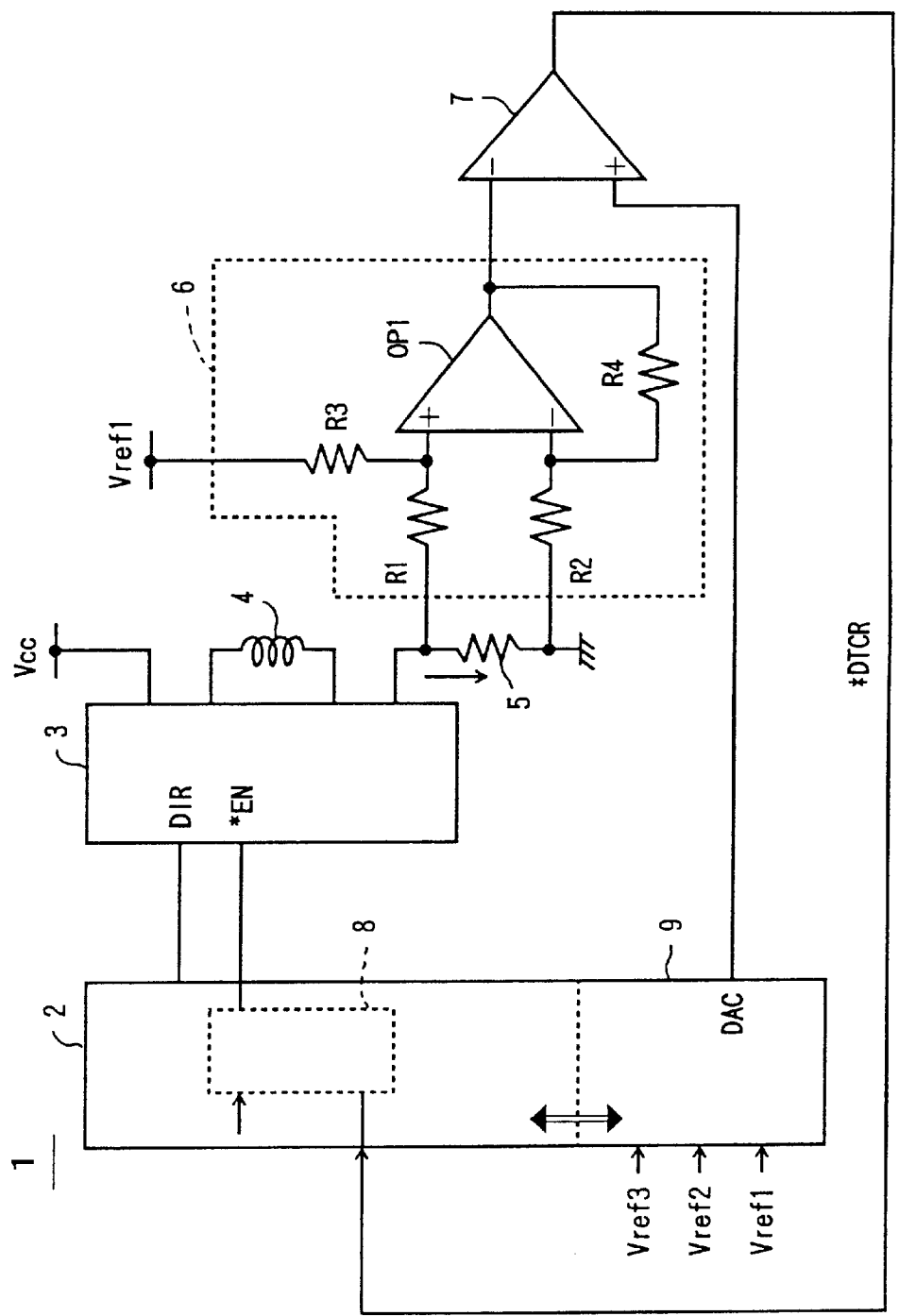
FIG. 1 is a block diagram of one example of the prior art.
Figure 2:
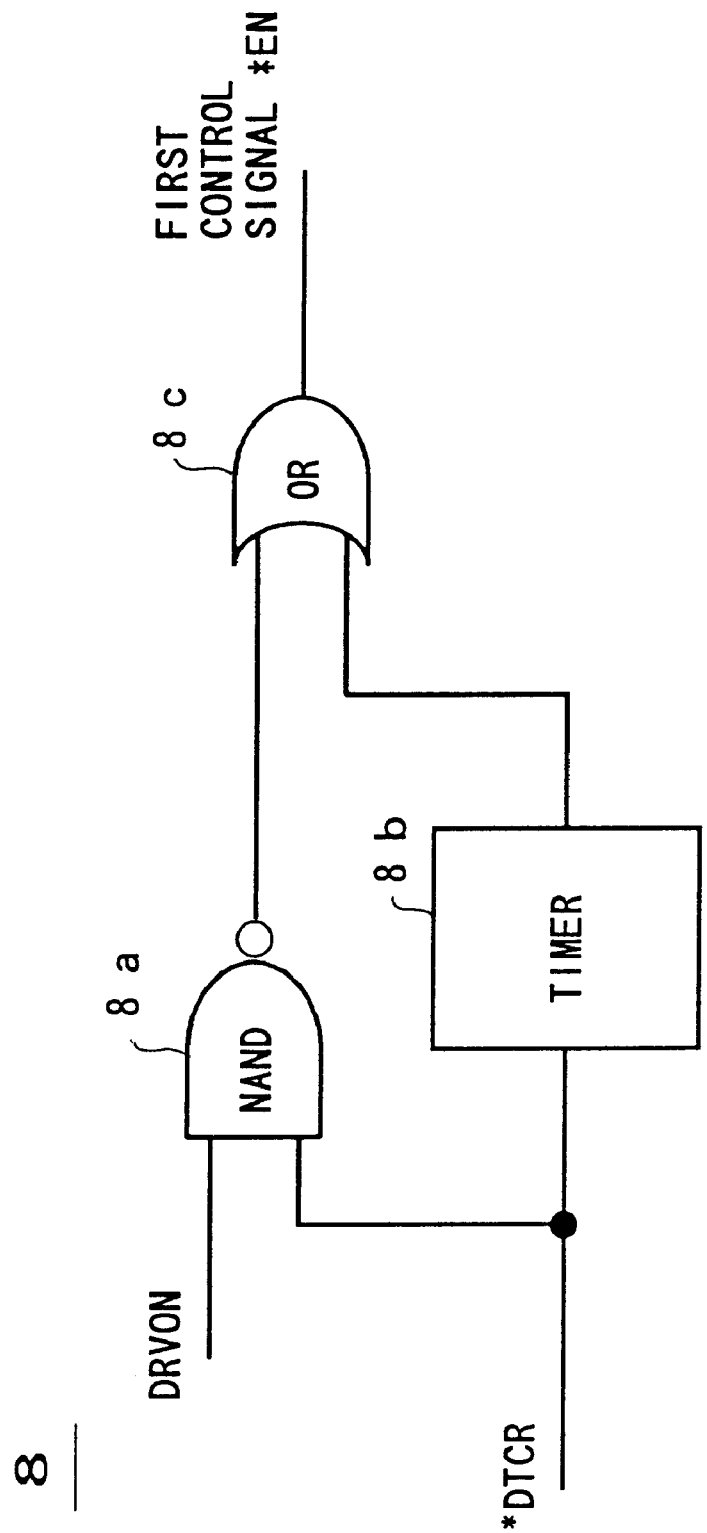
FIG. 2 is a block diagram of a logic circuit of the example of the prior art.
Figure 3:
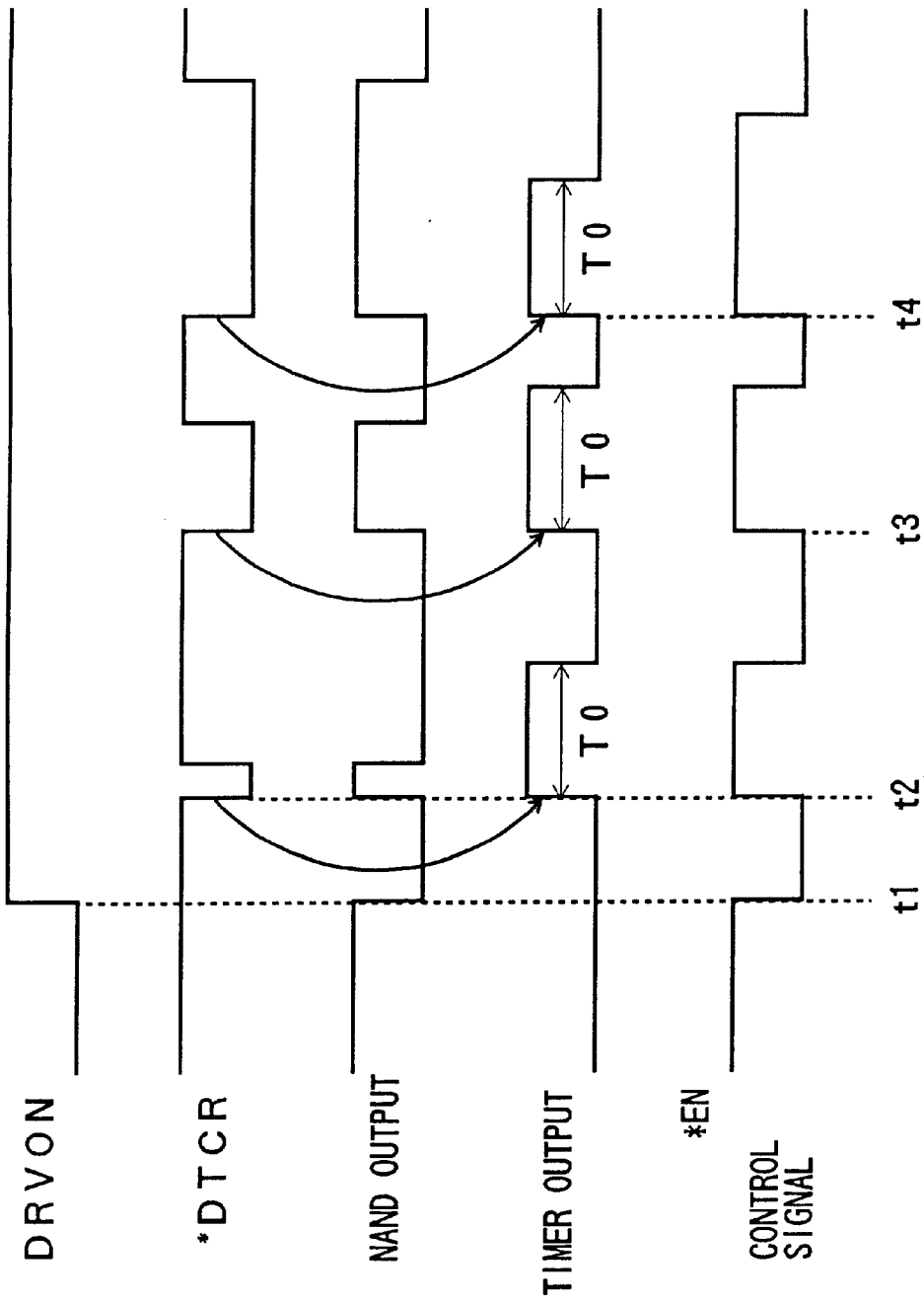
FIGS. 3A to 3E show signals in the logic circuit of the example of the prior art.
Figure 4:
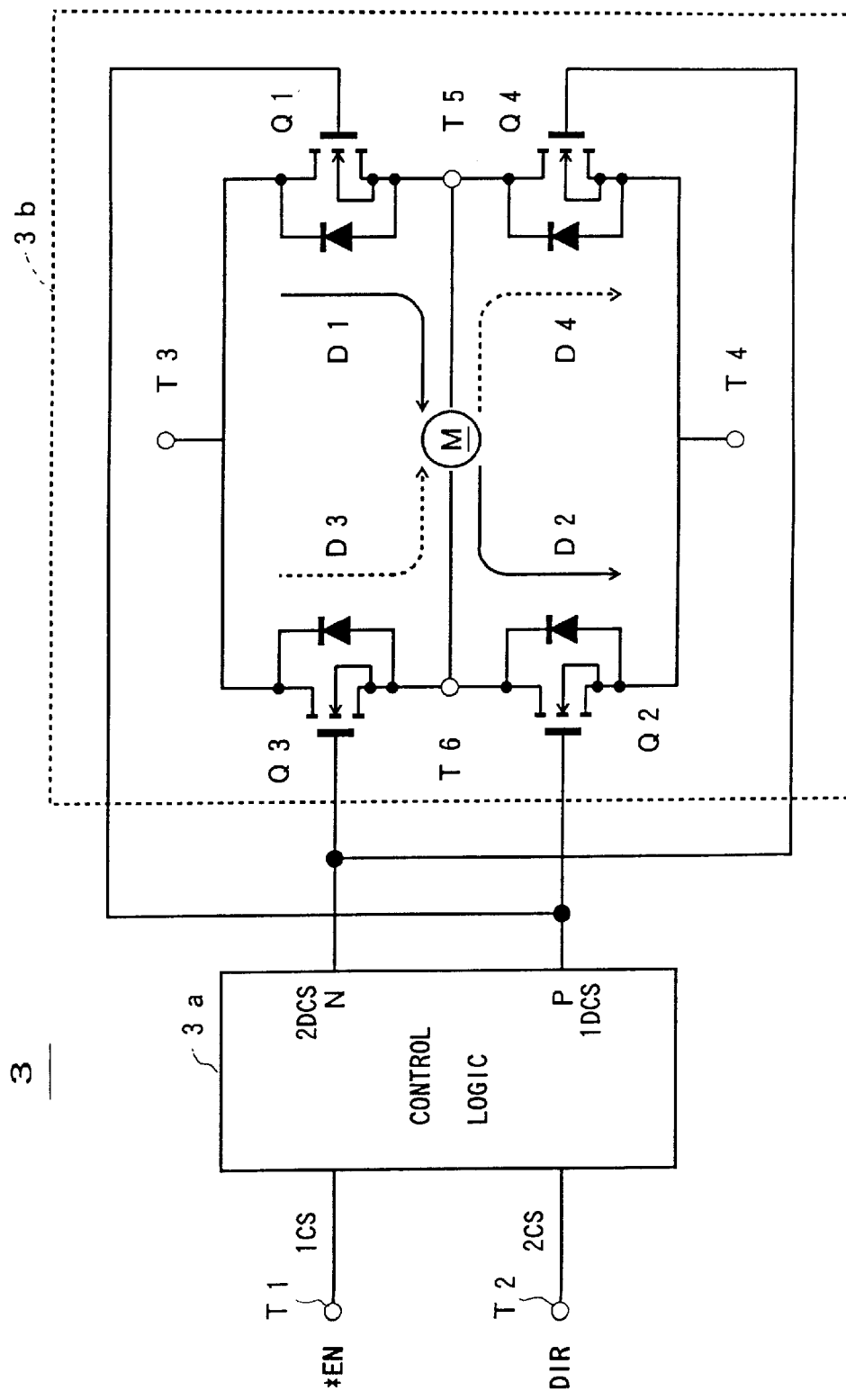
FIG. 4 is a block diagram of a driver of the example of the prior art.
Figures 6A, 6B, 6C:
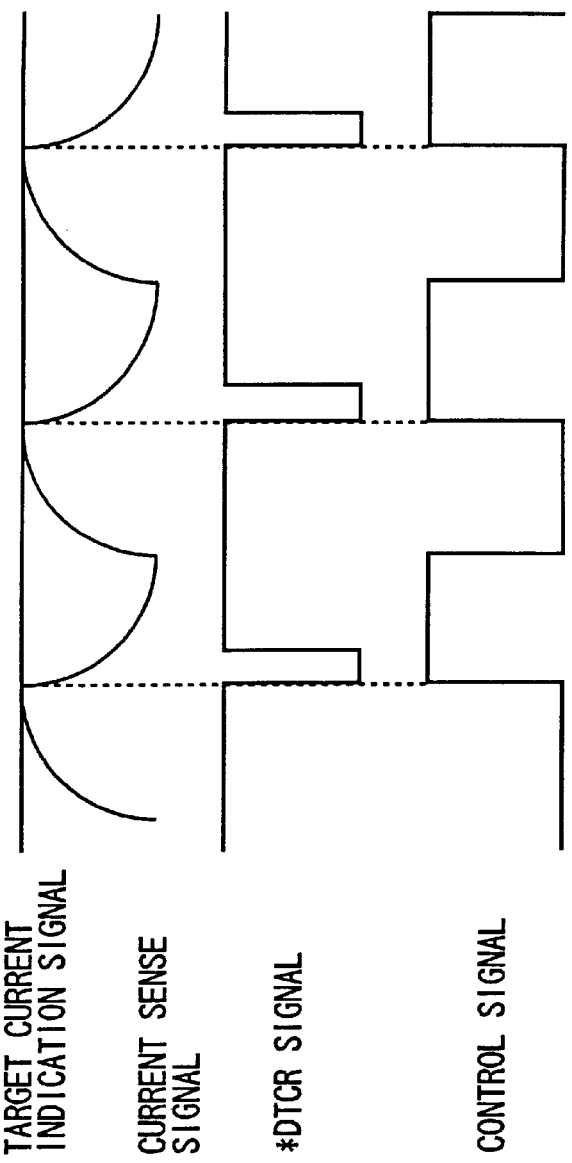
FIGS. 6A to 6C show signals in the example of the prior art.

The drive circuit 101 has the same circuit structure as the driver IC 3 of FIG. 1. The sense resistance 102 is equivalent to the sense resistance 5 in FIG. 1, and the comparator circuit 104 is equivalent to the comparator circuit 7 in FIG. 1.

In this embodiment, the drive circuit 101, the current sense circuit 103, and the comparison circuit 104 are included in a signal IC chip.

Figure 7:
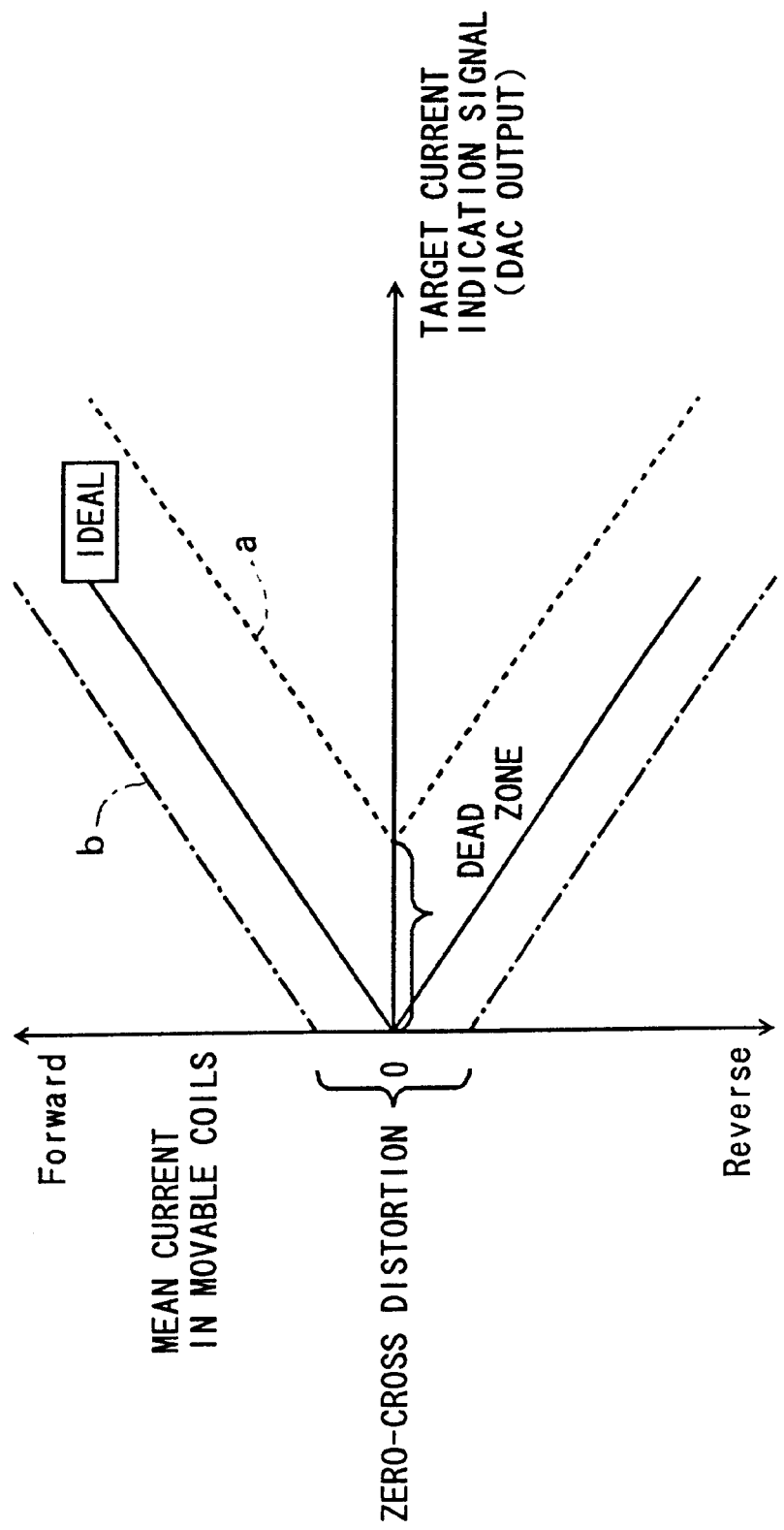
FIG. 7 shows the characteristics of the mean drive current of the control logic of the example of the prior art.

In the current sense circuit 103, the feedback resistance is set as (R4+R5)>R3, so that a dead zone is caused in the characteristics of a mean drive current with respect to a target current indication signal, as shown by the broken line in FIG. 7.

A bias voltage to be applied to the non-inverting input terminal of an operational amplifier OP1 of the current sense circuit 103 can also be set so as to obtain the same characteristics having a dead zone as shown in FIG. 7.

Figure 12:
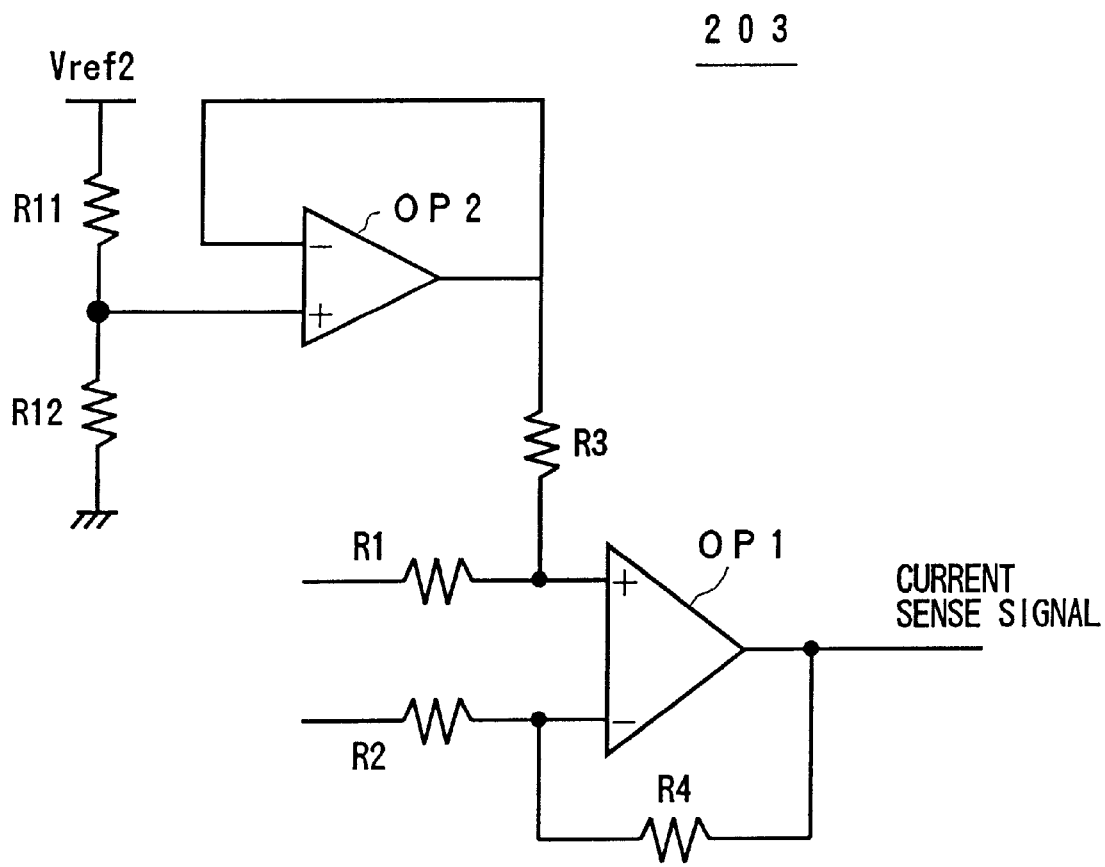
FIG. 12 is a block diagram of a first modification of a current sense circuit of the first embodiment of the present invention.

FIG. 12 is a block diagram of a modification of the current sense circuit of the first embodiment of the present invention.

A current sense circuit 203 of this modification divides a reference voltage Vref2 (>Vref1) by resistances R11–R12, and supplies it to a resistance R3 via an operational amplifier OP2. Thus, the bias voltage of the non-inverting input terminal of the operational amplifier OP1 can have the characteristics having a dead zone, as shown by the broken line in FIG. 7.

An output signal *DTCR of the comparator circuit 104 is sent to the control circuit 105, and is used to generate a first control signal *EN for PWM-driving the VCM 68. A level detector is built in the control circuit 105, and the results of the level detection of the *DTCR are stored in a DTCR register 106a.

Figure 13:
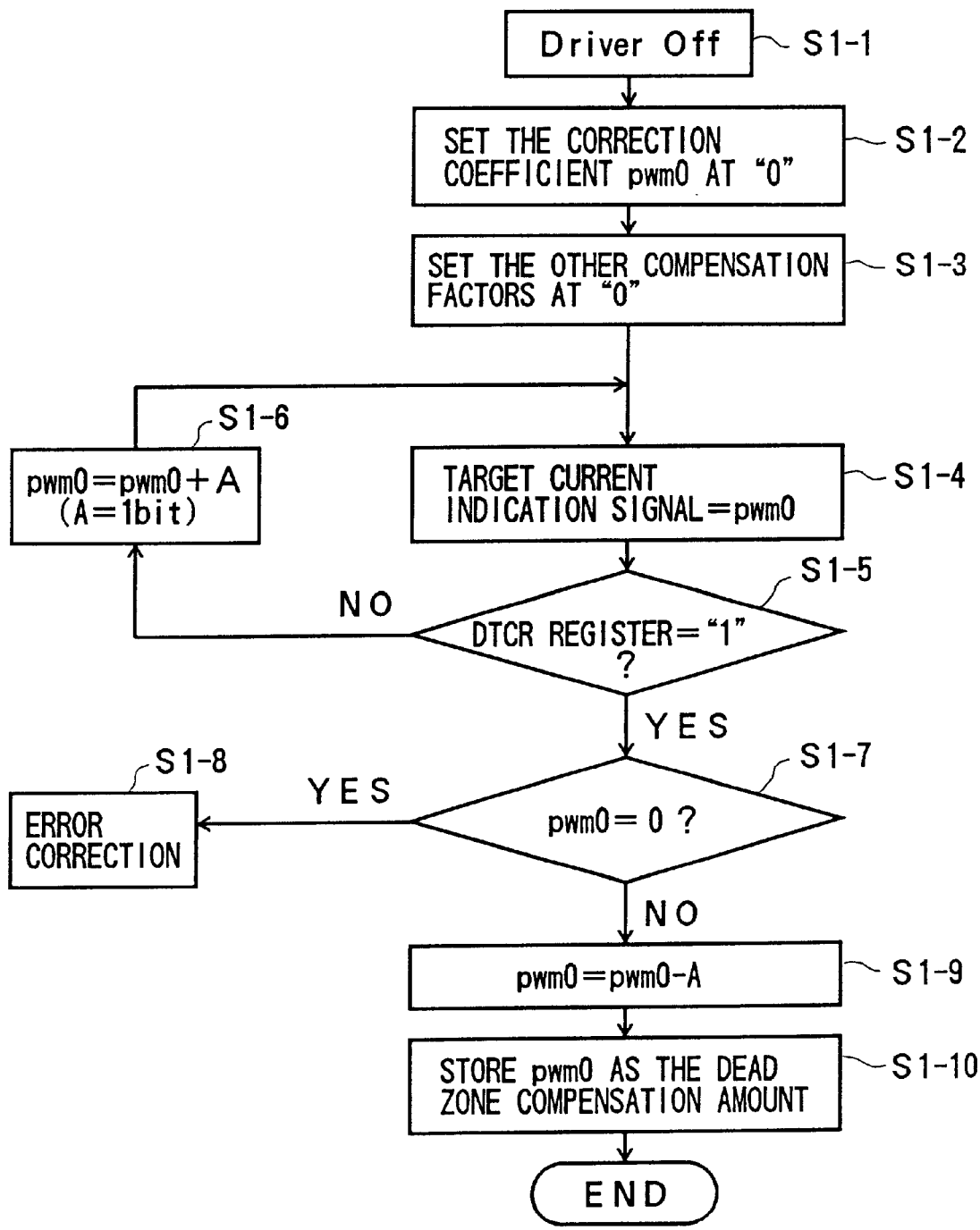
FIG. 13 is a flowchart of an adjustment process of the first embodiment of the present invention.

FIG. 13 is a flowchart of an adjustment process of the first embodiment of the present invention.

The control circuit 105 sets an inner control signal DRVON at a low level, so that the first control signal *EN to be supplied to the drive circuit 101 can be set at a high level. Thus, the drive circuit 101 is put in an off state (step S1-1).

A correction coefficient pwm0 is set at "0" (step S1-2).

Other compensation factors related to the driving of the VCM 68 are set at "0" (step S1-3).

A target current indication value is set at the correction coefficient pwm0 (step S1-4). The level of an output signal from the comparator circuit 104 is detected, and it is judged whether the DTCR register 106a is "1" or not (step S1-5).

If the DTCR register 106A is "0", i.e., if the output signal of the current sense circuit 103 is larger than the target current indication signal so that the output of the comparator circuit 104 is "0", the correction coefficient pwm0 is set at (pwm0+A) (step S1-6). The operation then returns to step S1-4.

If the DTCR register 106a is "1" in step S1-5, i.e., if the output signal from the current sense circuit 103 is smaller than the target current indication signal so that the output of the comparator circuit 104 is "1", whether the correction coefficient pwm0 is "0" is judged (step S1-7). If pwm0 is "0" and the DTCR register 106a is "1", the output signal from the current sense circuit 103 is smaller than the target current indication signal; the output of the comparator circuit 104 is "1"; the drive signal DRVON is at a high level; and the first control signal *En is at a low level. Here, the PWM driving is started, as described before. This is indicated by the dot-and-dash line b in FIG. 7. However, if the VCM 68 is driven in these conditions, the operation of the VCM 68 would be unstable. Therefore, an error process is carried out (step S1-8).

If pwm0 is not "0" in step S1-7, it is judged that the amount of offset has been detected correctly. The target current indication signal pwm0=(pwm0–A) immediately before the output of the comparator circuit 104 becomes "1" is calculated (step S1-9), and the calculated pwm0 is stored as the amount of offset in the memory (step S1-10).

In this embodiment, an inversion of the value of the DTCR register 106a is detected so as to detect the amount of a dead zone, with the drive circuit 101 being turned off by the control circuit 105. However, the detection can also be carried out according to the pulse width of the output of the comparator circuit 104, with the drive circuit 101 being turned off.

In such a case, if the drive signal DRVON is at a high level while the output signal *DTCR is at a low level with the current control loop being on, the first control signal *EN reaches the high level, and no current flows into the VCM 68. Once the output signal *DTCR reaches the high level, the PWM driving is started, and the level of the output signal *DTCR becomes unstable. A circuit for measuring a pulse width is built in the control circuit 105, and the measured pulse width of the output signal *DTCR is stored in the DTCR register 106a.

Figure 14:
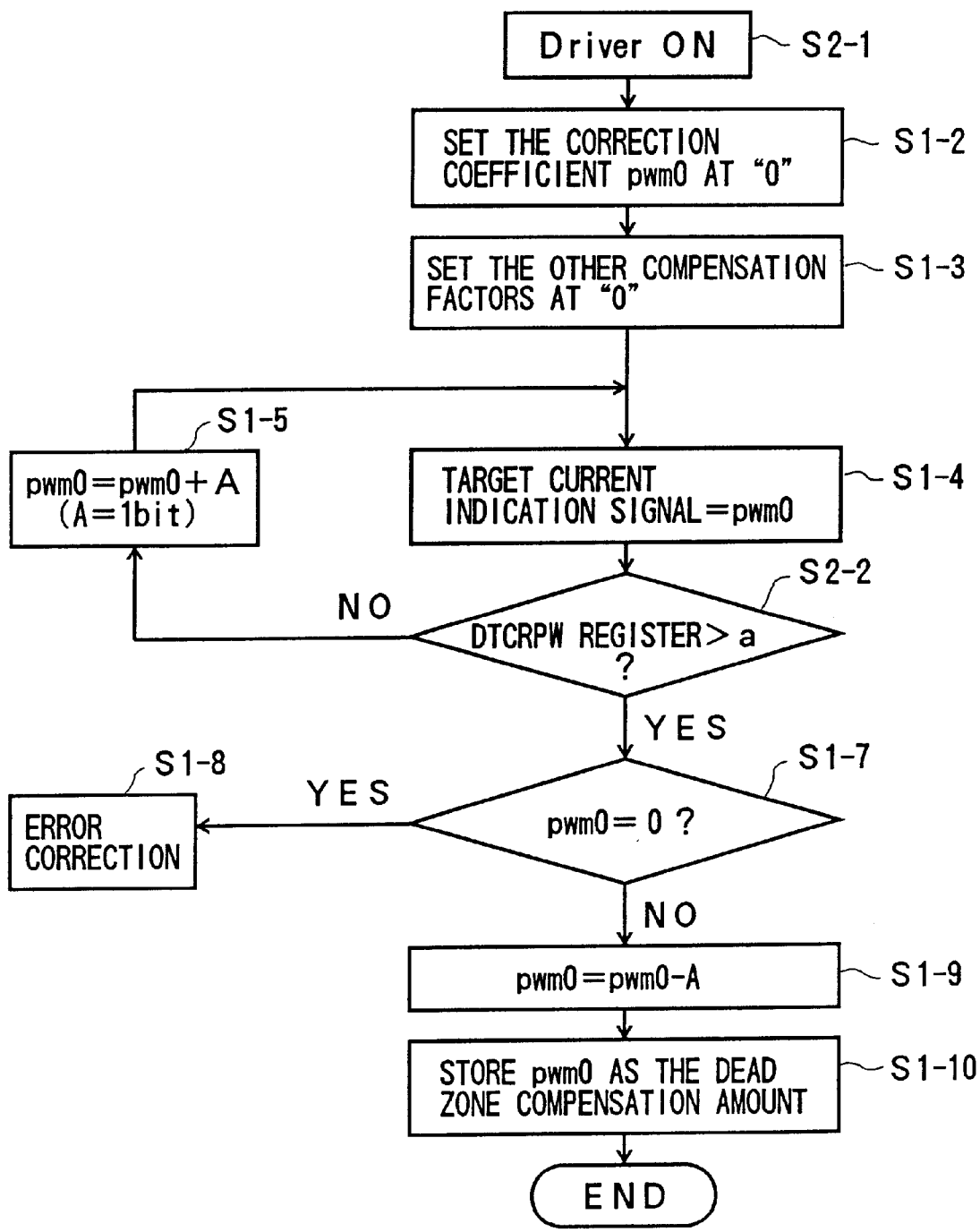
FIG. 14 is a flowchart of a first modification of the adjustment process of the first embodiment of the present invention.

FIG. 14 is a flowchart of a first modification of the adjustment process of the first embodiment of the present invention. In FIG. 14, the same procedures as in FIG. 13 are indicated by the same reference numerals.

In this modification, the inner control signal DRVON is set at a high level at the start of the adjustment process, and the current control loop is switched on (step S2-1).

The correction factor pwm0 in the internal memory is set at "0" (step S1-2), the other compensation factors in the driving of the VCM 68 are set at "0" (step S1-3), and the target current indication value is set at the correction coefficient pwm0 (step S1-4).

In this modification, from a DTCRPW register 106b which stores the pulse width of the output signal of the comparator circuit 104, it is judged whether the stored pulse width is larger than a predetermined value a (step S2-2). When the output signal of the comparator circuit 104 reaches the high level, the high-level period of the output signal of the comparator circuit 104 is counted, and the count value is stored in the DTCRPW register 106b. In this manner, the output signal of the comparator circuit 104 can be judged to be at the high level from the value in the DTCRPW register 106b. Here, whether the pulse width is larger than the predetermined value a is judged, so that the PWM driving can be started correctly, and a current can be recognized.

In this modification, the amount of the dead zone is detected from the current indication value when the pulse width becomes larger than the predetermined value a. The pulse width is detected from the DTCRPW register 106b, which stores the pulse width of the output signal of the comparator circuit 104. However, it is also possible to detect the amount of the dead zone from the current indication value when the count value of the output signal of the comparator circuit 104 becomes a predetermined count value.

In such a case, a pulse counter circuit is built in the control circuit 105, and the pulse count value of the output signal *DTCR is stored in a DTCRCNT register 106c.

Figure 15:
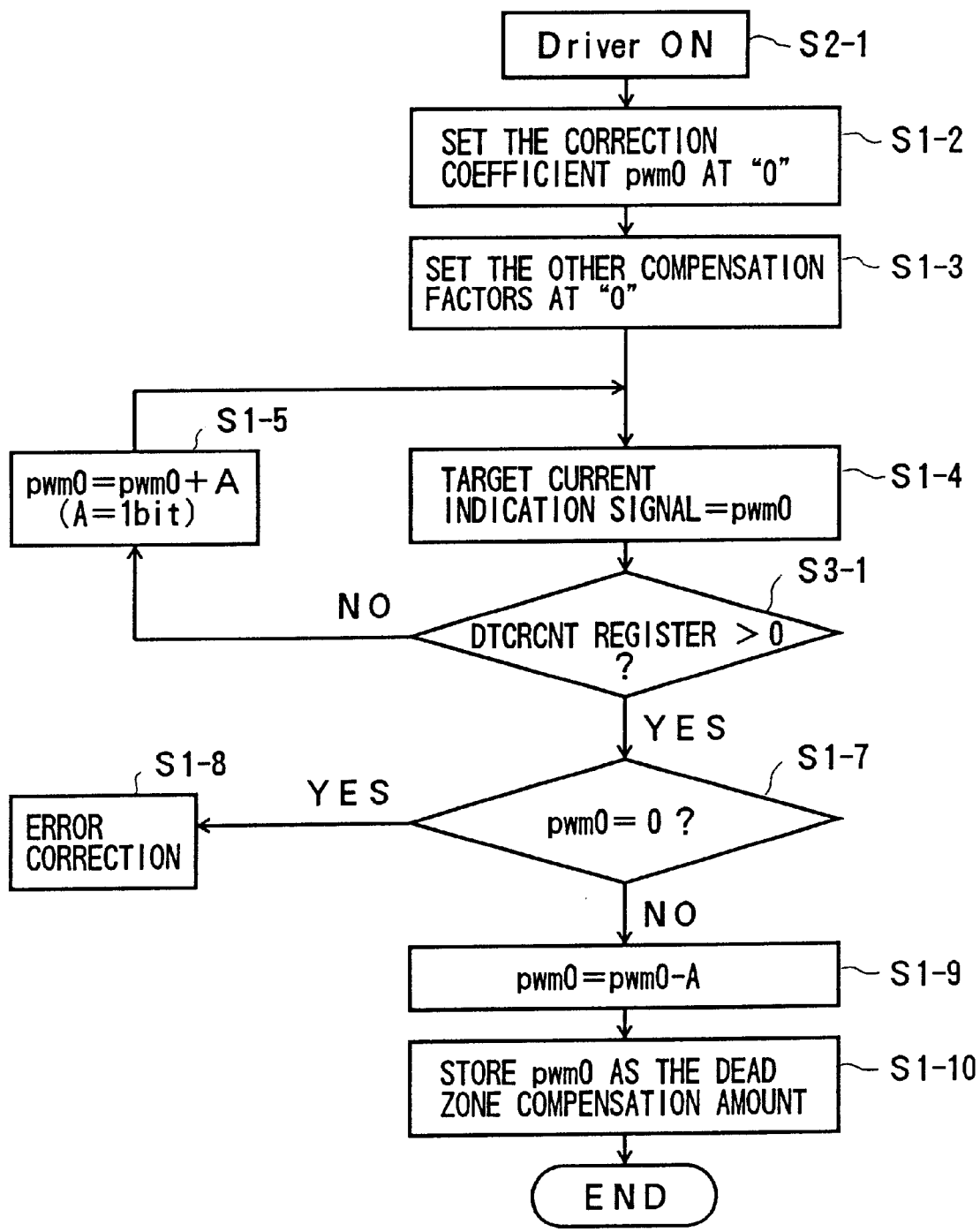
FIG. 15 is a flowchart of a second modification of the adjustment process of the first embodiment of the present invention.

FIG. 15 is a flowchart of a second modification of the adjustment process of the first embodiment of the present invention. In FIG. 15, the same procedures as in FIG. 14 are indicated by the same reference numerals.

In this modification, the count value of the output signal of the comparator circuit 104 is detected from the DTCRCNT register 106c. When the count value becomes larger than "0", the target current indication signal is set at the correction coefficient pwm0.

In this modification, the inner control signal DRVON is set at a high level at the start of the adjustment process, so that the current control loop is on (step S2-1).

As also shown in FIGS. 13 and 14, the correction coefficient pwm0 in the internal memory is set at "0" (step S1-2), the other compensation factors in the driving of the VCM 68 are set at "0" (step S1-3), and the target current indication value is set at the correction coefficient pwm0 (step S1-4).

In this modification, it is judged whether the count value in the count register is larger than "0", from the DTCRCN register 106c that stores the count value of the output signal of the comparator circuit 104 (step S3-1). When the output signal of the comparator circuit 104 reaches the high level, the output signal is counted, and the count value is stored in the DTCRCNT register 106c. The PWM driving is started in accordance with the count value in the DTCRCNT register 106c, so that a current starts flowing into the VCM 68.

As described above, the correction coefficient pwm0 is added to the target current indication value as the compensation value for a dead zone, so that the mean drive current can be linearly set with respect to the target current indication value without the dead zone.

In the characteristics having a dead zone indicated by the broken line a in FIG. 7, the correction value pwm0 is added to the target current indication value to eliminate an offset of the current control loop. Also, since the current sense circuit is made to cause a dead zone, the characteristics indicated by the dot-and-dash line b in FIG. 7 are not caused. Instead, the ideal characteristics indicated by the solid line in FIG. 7 are obtained.

In the first embodiment described above, to create a dead zone in the current sense circuit 103 in advance, the minimum voltage Vref1 of the target current indication signal is invariably given to the current sense circuit 103, and the target current indication signal is gradually increased in the adjustment process. The zero point of the target current indication signal is then detected from the output of the comparator circuit 104. However, the reference voltage given to the current sense circuit 103 is gradually varied to detect the zero point of the target current indication signal.

Figure 16:
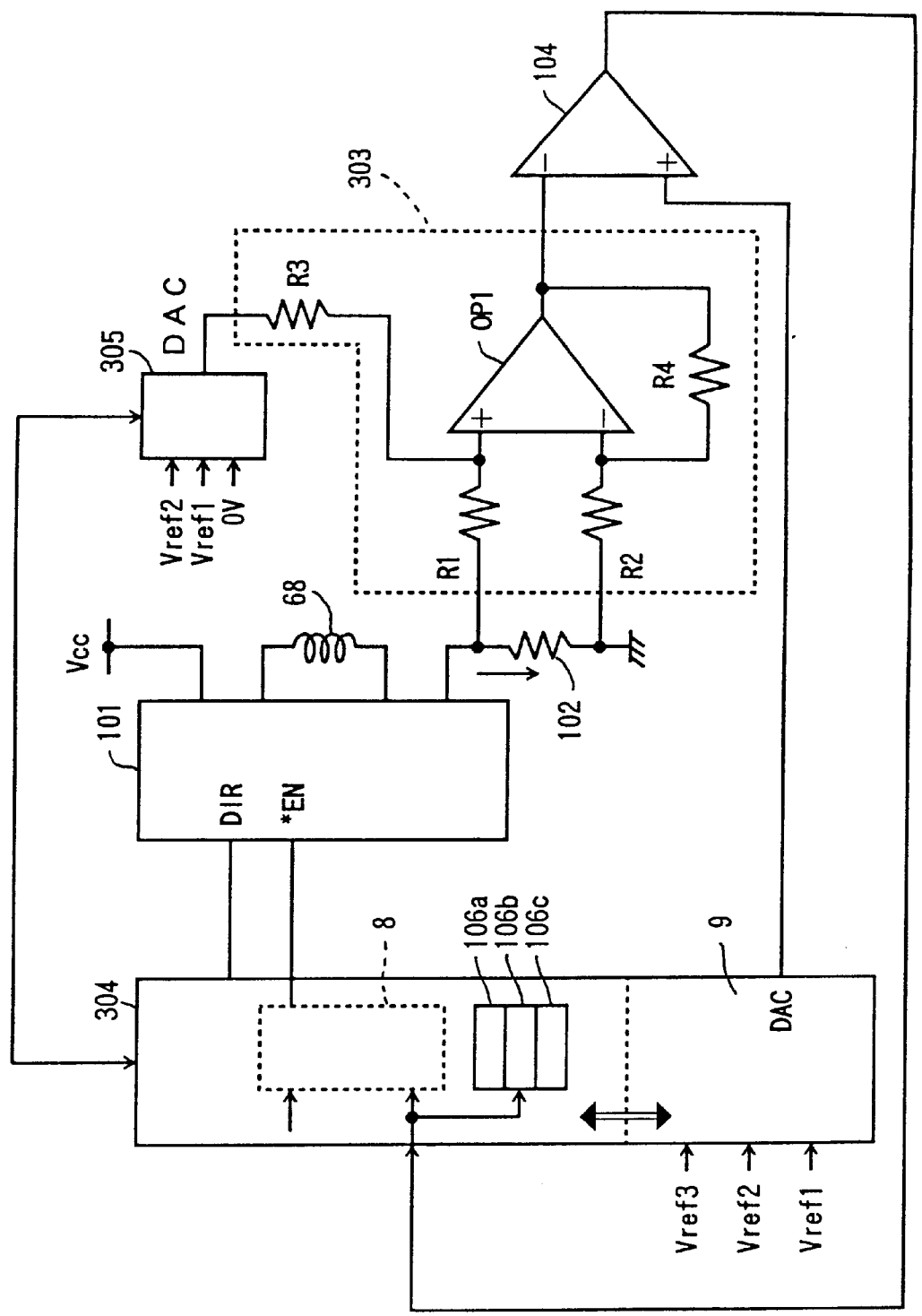
FIG. 16 is a block diagram of a second embodiment of the present invention.

FIG. 16 is a block diagram of a driver of a second embodiment of the present invention. In FIG. 16, the same components as in FIG. 11 are indicated by the same reference numerals.

A driver 66 of this embodiment is different from the first embodiment in the structure of a current sense circuit 303 and adjustment control by a control circuit 304.

In this embodiment, a reference voltage Vref1 is supplied to the current sense circuit 303 by a DAC 305, and the control circuit 304 can adjust the reference voltage Vref1. The DAC 305 can output both a larger voltage and a smaller voltage than the reference voltage Vref1.

Figure 17:
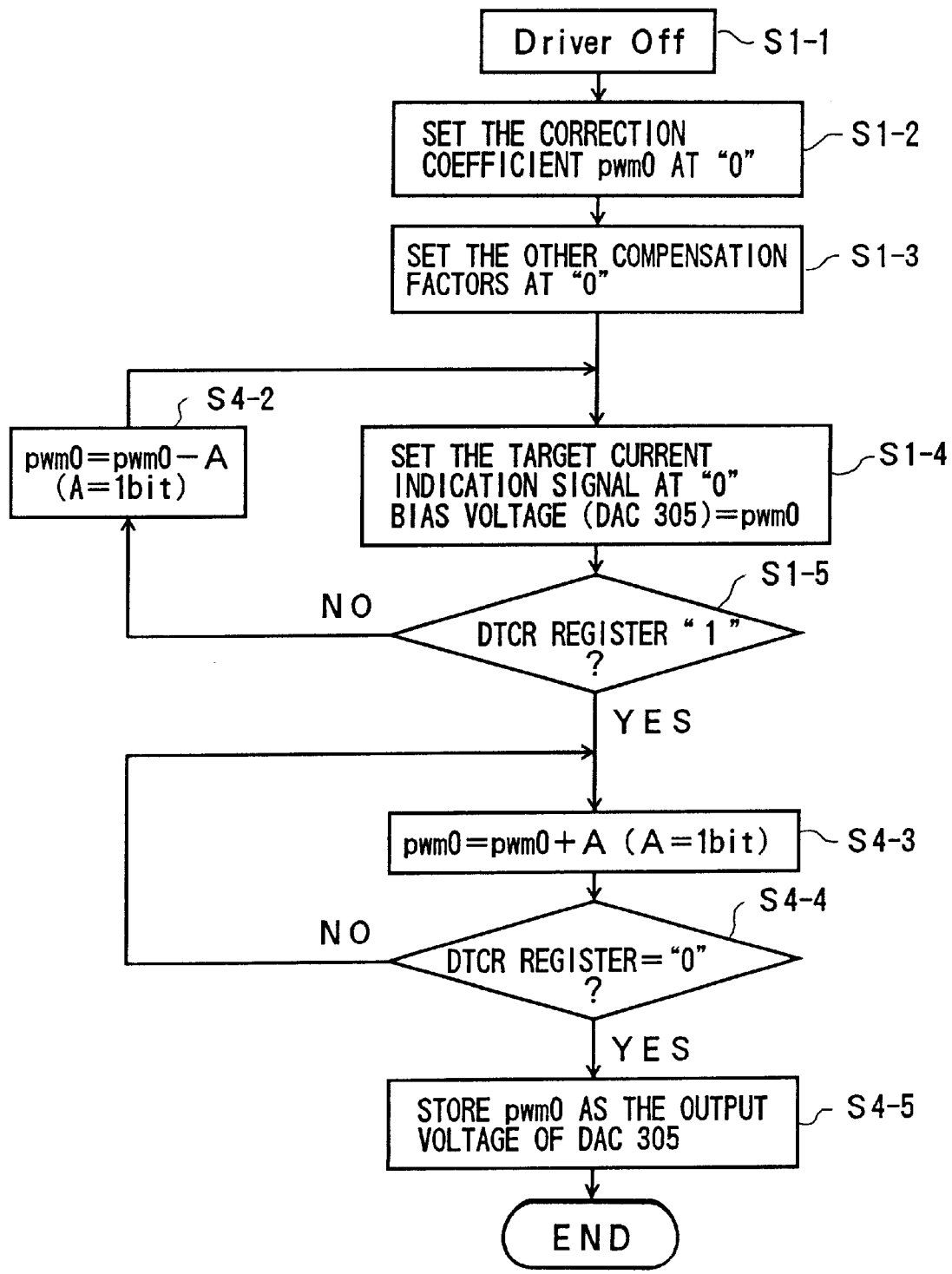
FIG. 17 is a flowchart of an adjustment process of the second embodiment of the present invention.

FIG. 17 is a flowchart of the adjustment process of the second embodiment of the present invention. In FIG. 17, the same procedures as in FIG. 13 are indicated by the same reference numerals.

In this embodiment, the target current indication signal to be inputted into the comparator circuit 104 is fixed at "0" (step S4-1). A bias voltage generated in the DAC 305 is set at pwm0, and pwmo is gradually changed (step S4-3). The output signal *DTCR of the comparator circuit 104 is then detected (step S4-4), and when the output signal *DTCR of the comparator circuit 104 changes, the correction coefficient pwm0 is stored as the output voltage of the DAC 305 (step S4-5).

The output signal may also be detected, with the drive circuit 101 being on, as shown in FIGS. 14 and 15.

In this embodiment, since the DAC 305 can output both a larger voltage and a smaller voltage than the reference voltage Vref1, the adjustment can be carried out for either of the characteristics indicated by the broken line a and the dot-and-dash line b in FIG. 7.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

The present application is based on Japanese priority application No. 11-42292, filed on Feb. 19, 1999, the entire contents of which are hereby incorporated by reference.

What is claimed is:

1. A method of adjusting a motor driving device, comprising the steps of:

detecting a current flowing in a motor;

generating a current detection signal based on the current;

comparing the current detection signal with a current indication value;

generating a comparison signal based on a relationship between the current detection signal and the current indication value;

controlling the current flowing in the motor in accordance with the comparison signal;

detecting the comparison signal while varying the current indication value or while varying a bias voltage of the current detection signal; and setting a zero level of the current indication value based on a variation of the comparison signal.

2. The method according to claim 1, further comprising the steps of:

detecting an inversion of the comparison signal, with a current control loop being off; and setting the zero level of the current indication value based on the current indication value when the comparison signal is inverted.

3. The method according to claim 1, further comprising the steps of:

detecting an inversion of the comparison signal, with a current control loop being on; and setting the zero level of the current indication value based on the current indication value when the comparison signal is inverted.

4. The method according to claim 1, further comprising the steps of:

counting the number of inversions of the comparison signal, with a current control loop being on; and setting the zero level of the current indication value based on the current indication value when the comparison signal is inverted.

5. The method according to claim 1, further comprising the steps of:

measuring a pulse width of the comparison signal, with a current control loop being on; and setting the zero level of the current indication value based on the current indication value when the pulse width of the comparison signal becomes a predetermined width.

6. The method according to claim 1, wherein the zero level of the current indication value is set based on a variation of an environmental temperature, or is set at a start of the motor driving device or at predetermined intervals.

7. A motor driving device comprising:

a current detection unit which detects a current flowing in a motor;

a comparator unit which compares the current detected by the current detection unit with a current indication value to generate a comparison signal;

a current control unit which controls the current flowing in the motor in accordance with a comparison result from the comparator unit; and a zero-level adjustment unit which detects the comparison signal while varying the current indication value or while varying a bias voltage of the current detection signal, and sets a zero level of the current indication value based on a variation of the comparison signal.

8. The motor driving device according to claim 7, wherein the zero-level adjustment unit detects an inversion of the comparison signal, with a current control loop being off, and sets the zero level of the current indication value based on the current indication value when the comparison signal is inverted.

9. The motor driving device according to claim 7, wherein the zero-level adjustment unit detects an inversion of the comparison signal, with a current control loop being on, and sets the zero level of the current indication value based on the current indication value when the comparison signal is inverted.

10. The motor driving device according to claim 7, wherein the zero-level adjustment unit counts the number of inversions of the comparison signal, with a current control loop being on, and sets the zero level of the current indication value based on the current indication value when the comparison signal is inverted.

11. The motor driving device according to claim 7, wherein the zero-level adjustment unit measures a pulse width of the comparison signal, with a current control loop being on, and sets the zero level of the current indication value based on the current indication value when the pulse width of the comparison signal becomes a predetermined width.

12. The motor driving device according to claim 7, further comprising a dead-zone setting unit which sets a dead zone, in advance, in characteristics of the current flowing in the motor with respect to the current indication value.

13. The motor driving device according to claim 7, further comprising a zero-level adjustment control unit which starts the zero-level adjustment unit based on a variation of an environmental temperature, or at a start of the motor driving device, or at predetermined intervals.

14. An information storage device comprising:

a recording head which records information on a recording medium;

an actuator which moves the recording head against the recording medium;

a drive control unit which detects a current flowing in the actuator, compares the detected current with a current indication value to generate a comparison signal, and controls the current flowing in the actuator in accordance with the comparison signal; and a zero-level adjustment unit which detects the comparison signal while varying the current indication value or while varying a bias voltage of the current detection signal, and sets a zero level of the current indication value based on a variation of the comparison signal.

15. The information storage device according to claim 14, wherein the zero-level adjustment unit detects an inversion of the comparison signal, with a current control loop being off, and sets the zero level of the current indication value based on the current indication value when the comparison signal is inverted.

16. The information storage device according to claim 14, wherein the zero-level adjustment unit detects an inversion of the comparison signal, with a current control loop being on, and sets the zero level of the current indication value based on the current indication value when the comparison signal is inverted.

17. The information storage device according to claim 14, wherein the zero-level adjustment unit counts the number of inversions of the comparison signal, with a current control loop being on, and sets the zero level of the current indication value based on the current indication value when the comparison signal is inverted.

18. The information storage device according to claim 14, wherein the zero-level adjustment unit measures a pulse width of the comparison signal, with a current control loop being on, and sets the zero level of the current indication value based on the current indication value when the pulse width of the comparison signal becomes a predetermined width.

19. The information storage device according to claim 14, further comprising a dead-zone setting unit which sets a dead zone, in advance, in characteristics of the current flowing in the actuator with respect to the current indication value.

20. The information storage device according to claim 14, further comprising a zero-level adjustment control unit which starts the zero-level adjustment unit in accordance with a variation in environmental temperature, or at a start of the information storage device, or at predetermined intervals.

* * * * *